US011994030B2

(12) United States Patent
Skulic

(10) Patent No.: US 11,994,030 B2
(45) Date of Patent: May 28, 2024

(54) SYSTEM FOR THE REVERSIBLE TRANSFORMATION OF A RECIPROCATING MOTION IN A ROTARY MOTION

(71) Applicant: IBS MOTORTECH ITALIA SRL, Naples (IT)

(72) Inventor: Ivan Skulic, Tribulje (HR)

(73) Assignee: IBS MOTORTECH ITALIA SRL, Naples (IT)

( * ) Notice: Subject to any disclaimer, the term of this patent is extended or adjusted under 35 U.S.C. 154(b) by 0 days.

(21) Appl. No.: 18/045,439

(22) Filed: Oct. 10, 2022

(65) Prior Publication Data

US 2023/0059790 A1 Feb. 23, 2023

Related U.S. Application Data

(63) Continuation of application No. 16/468,110, filed as application No. PCT/IB2017/057765 on Dec. 9, 2017, now Pat. No. 11,466,569.

(30) Foreign Application Priority Data

Dec. 9, 2016 (IT) ........................ 102016000124647

(51) Int. Cl.
*F01B 9/06* (2006.01)
*F01B 1/06* (2006.01)
(Continued)

(52) U.S. Cl.
CPC .............. *F01B 1/0624* (2013.01); *F01B 9/06* (2013.01); *F01B 2009/061* (2013.01);
(Continued)

(58) Field of Classification Search
CPC .. F01B 1/062; F01B 1/0624; F01B 2009/061; F01B 9/06; F02B 2075/1864; F02B 57/08; F02B 75/222; F02B 75/265
See application file for complete search history.

(56) References Cited

U.S. PATENT DOCUMENTS 1,087,240 A 2/1914 Kellington
1,282,824 A 10/1918 Hartson
(Continued)

FOREIGN PATENT DOCUMENTS

DE 653623 C 11/1937
DE 654870 C 12/1937
(Continued)

*Primary Examiner* — George C Jin
*Assistant Examiner* — Teuta B Holbrook
(74) *Attorney, Agent, or Firm* — Browdy and Neimark, PLLC

(57) ABSTRACT

System for the reversible transformation of a reciprocating motion in a rotary motion, which may include one or more actuating devices adapted to cooperate with a rotor which has a spiral shaped section, and has at least one interaction surface for interacting with said one or more actuating devices. Each actuating device of said plurality of actuating devices is an internal combustion cylinder and piston device. Each actuating device is associated with a rod which incorporates a slider with a follower which engages with said at least one interaction surface of said rotor.

14 Claims, 7 Drawing Sheets

(51) Int. Cl.

| | |
|---|---|
| *F02B 57/08* | (2006.01) |
| *F02B 75/18* | (2006.01) |
| *F02B 75/22* | (2006.01) |
| *F02B 75/26* | (2006.01) |

(52) U.S. Cl.

CPC ....... *F02B 57/08* (2013.01); *F02B 2075/1864* (2013.01); *F02B 75/222* (2013.01); *F02B 75/265* (2013.01)

(56) References Cited

U.S. PATENT DOCUMENTS

| | | | | | |
|---|---|---|---|---|---|
| 1,456,479 | A | | 5/1923 | Atkinson et al. | |
| 1,528,164 | A | | 3/1925 | Nordwick | |
| 1,810,688 | A | * | 6/1931 | Clark | F01B 9/06 123/55.3 |
| 2,120,657 | A | * | 6/1938 | Tucker | F02B 75/222 123/54.3 |
| 2,124,604 | A | * | 7/1938 | Bidwell | F01B 9/06 123/53.5 |
| 2,174,664 | A | | 10/1939 | Korany | |
| 2,217,796 | A | | 10/1940 | Eugene | |
| 2,249,951 | A | | 7/1941 | Fulton | |
| 2,450,912 | A | * | 10/1948 | Putnam | F02B 75/246 92/74 |
| 3,688,751 | A | | 9/1972 | Sahagian | |
| 3,841,279 | A | | 10/1974 | Burns | |
| 4,899,853 | A | | 2/1990 | Hummel | |
| 5,634,441 | A | | 6/1997 | Ragain | |
| 7,942,115 | B2 | * | 5/2011 | Skulic | F02B 75/32 123/55.3 |
| 10,408,201 | B2 | * | 9/2019 | Smith | F04B 25/00 |
| 2003/0024493 | A1 | | 2/2003 | Beierle | |
| 2003/0131808 | A1 | * | 7/2003 | Al Hawaj | F01B 13/04 123/44 B |
| 2007/0068468 | A1 | | 3/2007 | Irick | |

FOREIGN PATENT DOCUMENTS

| | | | | |
|---|---|---|---|---|
| DE | 2413947 | A1 | | 10/1974 |
| DE | 4344545 | A1 | | 6/1995 |
| EP | 0318817 | A2 | | 6/1989 |
| FR | 2599084 | A1 | * | 11/1987 |
| GB | 457876 | | | 12/1936 |
| WO | 1996/18261 | A1 | | 5/1996 |
| WO | 2004/031576 | A1 | | 4/2004 |
| WO | 2006/057018 | A1 | | 6/2006 |

* cited by examiner

SYSTEM FOR THE REVERSIBLE TRANSFORMATION OF A RECIPROCATING MOTION IN A ROTARY MOTION

The present invention relates to a system for the reversible transformation of a reciprocating motion in a rotary motion and, more precisely, to a system for the reversible transformation of a reciprocating motion in a rotary motion which incorporates a spiral rotor.

STATE OF THE ART

An internal combustion engine is known from US document

U.S. Pat. No. 7,942,115 which describes a system for converting a reciprocating rectilinear motion into a rotational motion. The system comprises an assembly of internal combustion cylinders, each of which has a rod which pushes a slider over the surface of a rotor. The rotor has a cross section with a spiral profile, and in such a way that the slider follows the surface and performs a compression and an expansion step. This solution of the prior art has proved satisfactory, although it has the disadvantage of that the thrust of the piston in the cylinder is based solely on the pressure of the combustion gas. This is a realization that decreases but does not solve the problems of environmental pollution, and is also relatively inefficient.

Consequently, there is a need to improve e operation of the internal combustion cylinder and spiral profile rotor system, in order to reduce the aforementioned problems of environmental pollution, and improve efficiency and, therefore, lower fuel consumption.

The present invention seeks to solve the abovementioned problems and drawbacks of the state of the art by providing a new energy supply system for the transformation of a reciprocating rectilinear motion in a rotational motion.

BRIEF DESCRIPTION OF THE INVENTION

Thus, the present invention provides a system for a reversible transformation of a reciprocating motion in a rotary motion which comprises one or more actuating devices onto a rotor having a spiral section and at least one interaction surface for the engagement with said one or more actuating devices, each actuating devices of the plurality of actuating devices including an internal combustion cylinder, and wherein each actuating device is associated with a rod that incorporates a slider having a follower engaging with said at least one interaction surface of said rotor, wherein the rod is associated to said combustion cylinder, the arrangement being such that the system provides for the rotation of the rotor by each actuating cylinder urging said interaction surface of said rotor via said slider continuously contacting said interaction surface and causing the rotation thereof.

According to the present invention, the follower of each slider of each actuating device it is urged and slides outwardly of said cylinder due to the expansion thereof, and a force onto said interaction surface it is transmitted resulting in a torque value onto said rotor.

The arrangement is such that at each complete revolution of the rotor, each actuating device makes a full combustion cycle in case of a two stroke combustion cylinder, or half combustion cycle in the case of a four stroke combustion cylinder.

Thus, the present invention provides a system for a reversible transformation of a reciprocating motion in a rotary motion according to the appended claims.

The present invention has several advantageous aspects here below illustrated.

By way of non-limiting example, the slider can be a wheel or, alternatively, also a low friction sliding surface (skid). The slider-wheel always contacts the surface of the spiral shaped rotor profile, thus transmitting the force from the device to the rotor surface transforming it into a driving torque.

It has to be pointed out here that the system of the present invention can use any internal combustion power device known for conversion/transmission, and with the aim of creating the torque on the rotor shaft.

As a non-limiting example, the system comprises fixed parts and moving parts. The former include a body of each cylinder, a supporting plate, and power supply to each cylinder. On the other hand, the moving parts comprise, a sliding rod, a rotating or sliding follower mounted at the end of the rod, the sliding members being housed inside said cylinder body.

Furthermore, auxiliary parts external to the above illustrated system are provided, such as for example fuel supply, electrical power supply, pumps and relevant hydraulic cooling fluid regulator/distributor for, and cooling fluid pump/pumps reservoir.

Preferably and according to the invention, a plurality of devices as described above can act on a single rotor member. The rotor can have a non-circular profile contact surface.

Thanks to the particular configuration of the spiral rotor, the thrust of each device it is transmitted on the rotor surface, causing the latter to rotate for a complete revolution in an expansion cycle of one of the springs.

The main feature of this system it is the ability to use the expansion phase of one of the actuating devices associated to and for carrying out useful work, i.e. the rotation of the rotor.

The present invention provides noteworthy new solutions with important improvements compared to the most pertinent state of the art U.S. Pat. No. 7,942,115, wherein an application of a rotor with a polar spiral profile combined with an internal combustion thermal unit (cylinder-piston) it is already known.

Advantageously and according to a first inventive aspect of the present invention, in the case of use of the spiral rotor in combination with internal combustion cylinders (cylinder-piston), a circular section (or a constant diameter) surface of the spiral rotor it is provided, and in order to keep the piston in a stopped position at the T.D.C. top dead center (so-called "piston dwelling") and during the combustion phase, thus obtaining a complete combustion at a constant volume. The same configuration of piston stop it is obtainable at the bottom dead center B.D.C. and for the complete waste/washing/filling phase of the cylinder.

According to another advantageous aspect of the present invention, it is possible to make the intercating surface of the rotor profile in different shapes. As a matter of, according to the state of the art document U.S. Pat. No. 7,942,115, the contacting surface with the cursor is always a flat surface on which the force generated by the cursor acts perpendicularly. On the other hand, according to the present invention the contacting surface of the slider/follower it is inclined and in such a way that different angles of inclination of the slider/follower can be provided, obtaining a greater efficiency, and thus obtaining a number of possible constructive configurations.

According to a farther advantageous aspect of the present invention, the cylinder expansion length it is expected to be decided by the constructor according to the project requirements.

According to another advantageous aspect of the present invention, it is possible to provide different embodiments of the system, wherein each of them has a determined arrangement of the actuating devices with respect to the rotor surface. More precisely, by varying the angle of inclination of the actuating devices with respect to the normal direction of the rotor surface it is possible to increase or decrease the value of the force exerted by the actuating devices on the interacting surface of the rotor, and consequently increase or decrease the torque value applied to the rotor, while maintaining the cycle phases unchanged.

According to another advantageous aspect of the present invention, it is possible to adjust the inclination of the actuating device (s) and, therefore, the direction of the force applied to the rotor, thus obtaining the possibility of varying the stroke of the urging member in a complete revolution of the rotor.

DETAILED DESCRIPTION OF THE INVENTION

A detailed description of some preferred embodiments of the system for the reversible transformation of a reciprocating motion in a rotary motion of the present invention will now be provided, given by way of non-limiting examples, and with reference to the accompanying drawings, wherein.

Figure 1:
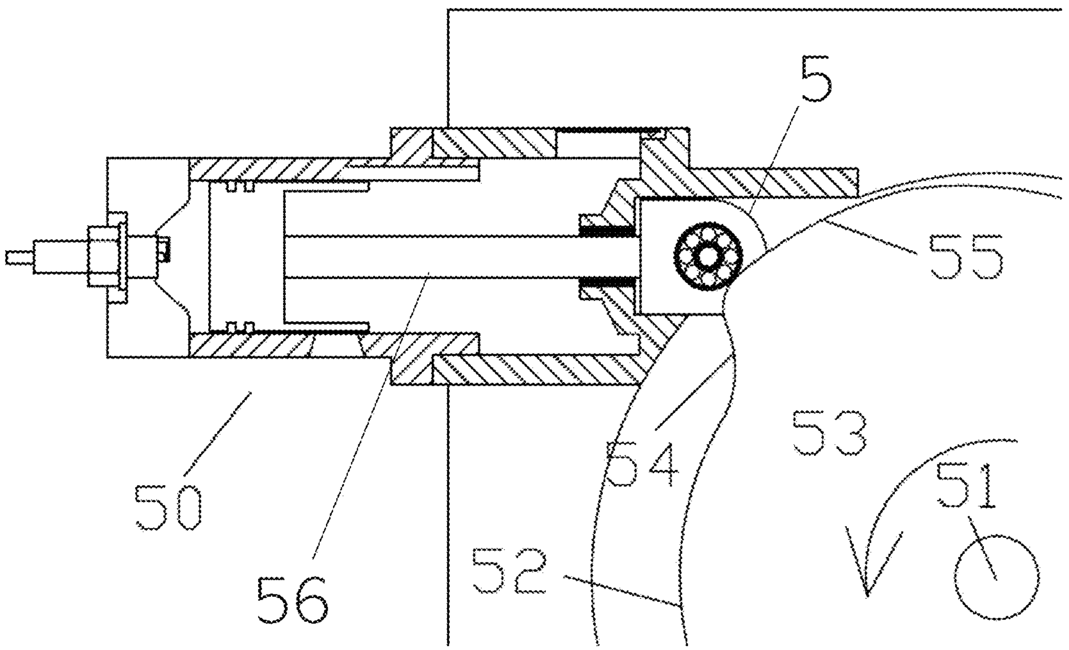
FIG. 1 is a schematic and cross-sectional views of a first operating condition of the system of the present invention, according to a first embodiment thereof, and wherein internal combustion cylinders are provided as actuating devices associated with a spiral profiled rotor.

With reference now to FIG. 1 and illustrated a first embodiment of the system of the present invention, where one or more actuating members (50) of internal combustion endothermic type are provided. Each actuating member is a combustion cylinder (50) which is associated with a rod (56) which incorporates a slider or a follower (5). The follower (5) engages with at least one interaction surface (52,55) of a rotor (53) in a rolling manner as evident in the figures.

The rotor (53) in FIG. 1 includes a section with a constant diameter profile (55) in order to keep the piston in a stopped position at the top dead center T.D.C. for the combustion phase, thus ensuring complete combustion at constant volume. The length of the section of the rotor having a constant diameter depends on the construction requirements that vary depending on the different types of fuel used and depending on the required thermodynamic values. The expansion of the cylinder is carried out at another section (52) of the spiral profile of the rotor (53), to which the drive shaft (51) is coupled. The compression in the cylinder takes place in the portion of the rotor profile such as the retraction ramp (54), after which the constant volume combustion takes place for the duration of the piston stop period, followed by the expansion and repetition of the cycle.

Figure 2:
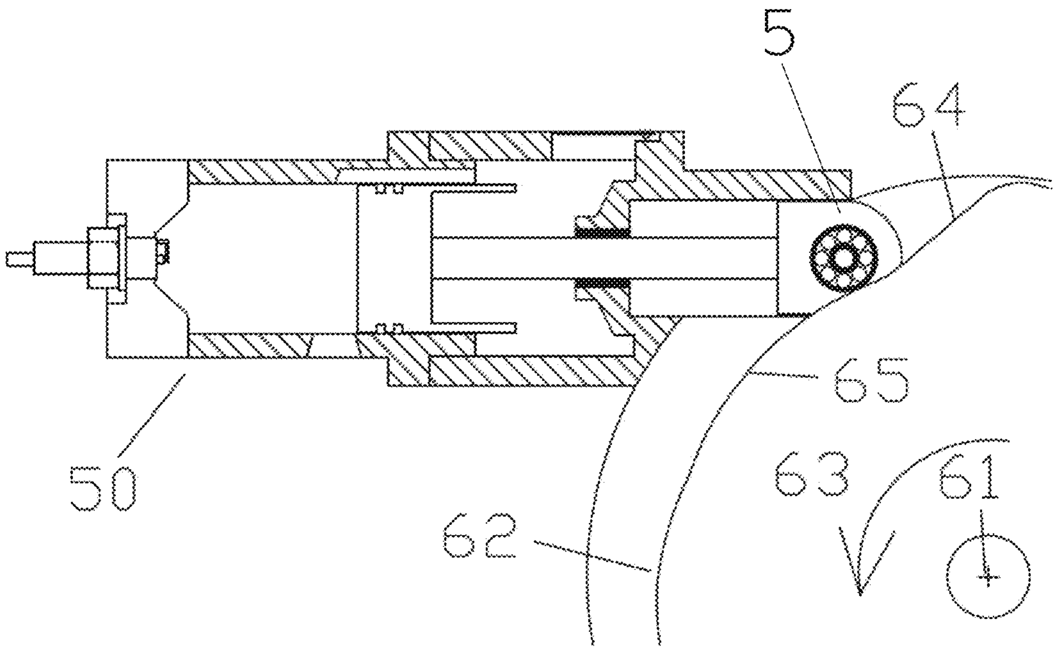
FIG. 2 is a schematic and cross-sectional views of a second operating condition of the system of FIG. 1 according to the present invention.

In FIG. 2 it is shown the condition wherein the cylinder (50) is kept in a stopped position at the bottom dead center B.D.C. for the complete waste/washing/filling phase of the cylinder. In this case, the rotor (63) is coupled to the drive shaft (61). The rotor (63) comprises a section having a constant diameter profile (65) extending from the exhaust valve opening position to the initial compression phase position. Compression is carried out via the ramp (64), while the expansion takes place on the section of the spiral profile (62) of the rotor (63). In this way the complete discharge of the burnt gases is assured.

Thanks to the configuration described above, a better washing of the cylinder (50) is obtained by expelling the burnt gas remaining in the cylinder and a complete filling of the cylinder with fresh air while the piston is not it moves and, therefore, does not interrupt the described cycle, unlike what happens in the current internal combustion engines.

Both the piston stop solutions to the T.D.C. and to the B.D.C they can be made on the same rotor (53,63). In this way, the characteristics and thermodynamic values of the cycles are considerably improved and more effective.

In each embodiment, the outer surface of the curvilinear profile of the rotor is in contact with the slider or follower (5) along a coplanar or orthogonal direction. In other words, the slider or follower (5) transmits a force to the rotor with an angle of 0° (coplanar) or an angle of 90° (orthogonal) with respect to the surface of the rotor.

Figure 3:
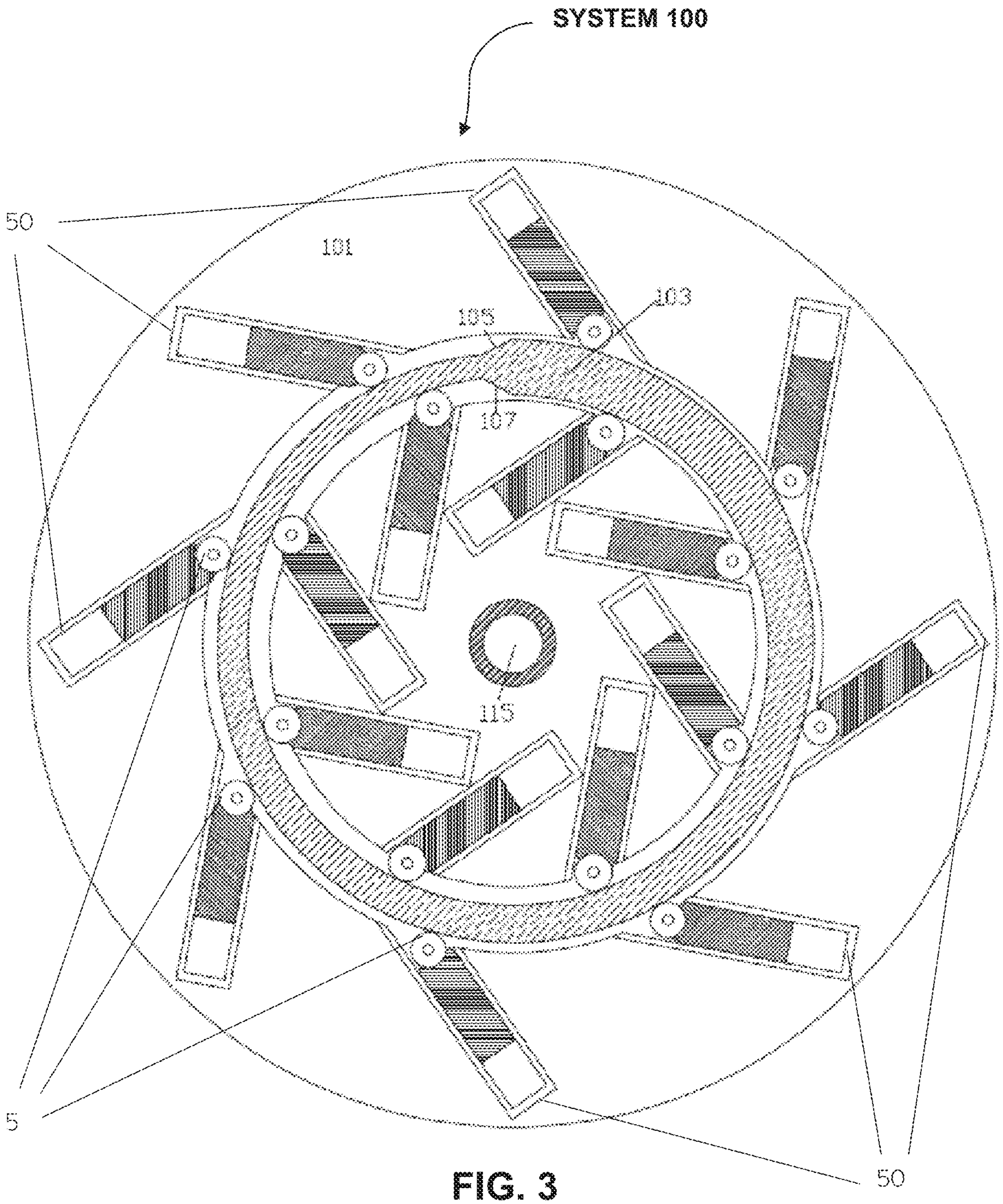
FIG. 3 is a schematic view of a second embodiment of the system of the present invention, wherein actuating devices acting both on an outer profile and on an inner profile of the spiral rotor are provided.

Referring now to FIG. 3, an alternative embodiment of the system of the present invention it is illustrated, wherein a rotary system consisting of a plurality of actuating devices (50) it is provided. The main difference with respect to the preceding embodiment it is the use of an annular rotor having both internal and external profiles. A system 100 comprises a circular device plate (101). A rotor (103) it is arranged inside the center of the plate (101). The rotor (103) has a first curvilinear outer spiral profile with a retracting ramp (105) which connects the ends of the curvilinear profile. The rotor (103) also comprises a second curvilinear inner spiral profile connected to a retraction ramp (107). In this way, on both surfaces of the rotor (103), several actuating devices (50) operate simultaneously.

It should be noted that each actuating device (50) of this system (100) has a structure similar to that shown in FIG. 1.

The external assembly and the inner assembly of devices (50) are coplanar to the rotor (103). Each actuating device (50) is arranged onto the plate (101).

The forces of the respective devices (50) are cumulative. In this way, more power can be supplied to a rotor (103) of the same size with respect to the embodiment of FIGS. 1 and 2.

The number of devices (50) that can be assembled on a rotor depends on its diameter and on the constructive choices. The more groups of devices are mounted on the internal and external profiles of the rotor (103), the more power will be transferred to the rotor (103). According to this embodiment, the actuating devices (50) operate on the rotor (103) in the manner as already described above and with reference to FIGS. 1 and 2. Furthermore, a drive shaft (115) is arranged at the center of the rotor (103). The drive shaft (115) is coupled to the rotor (103) so as to rotate with it.

Figure 4:
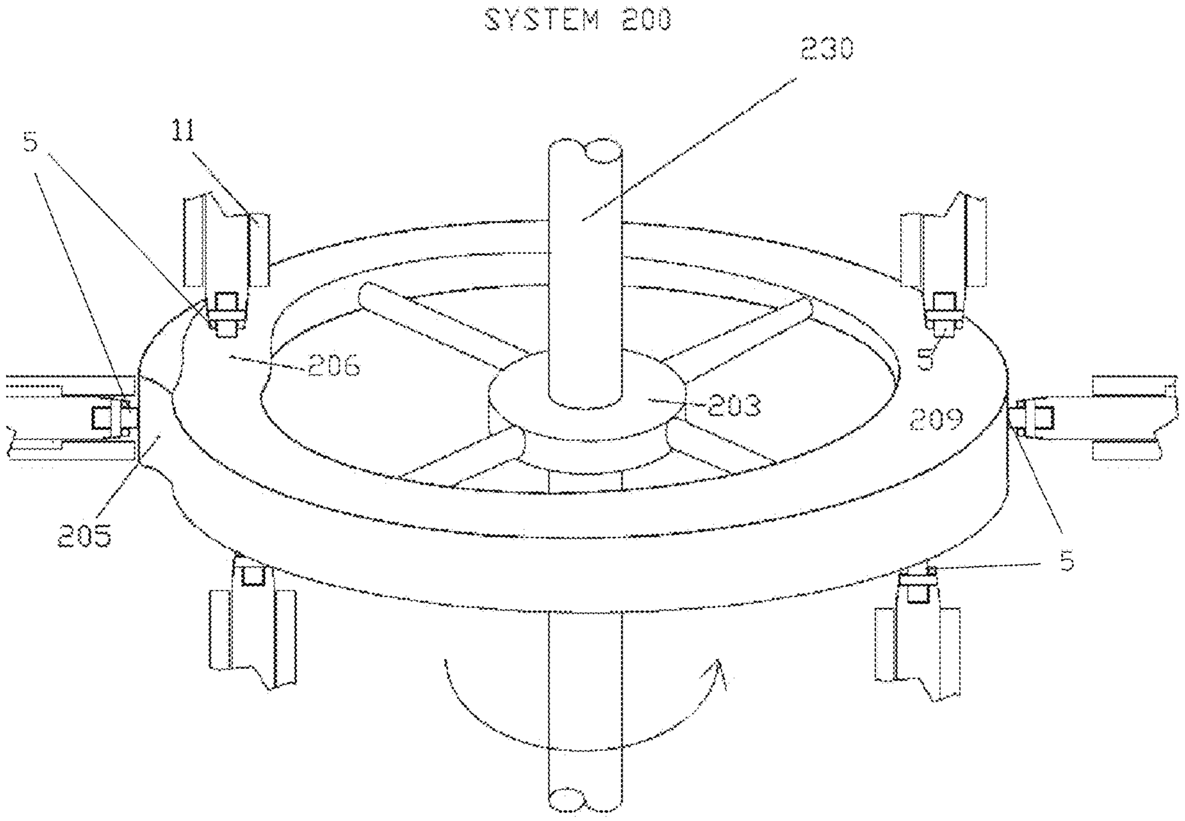
FIG. 4 is a schematic view of a third embodiment of the system of the present invention, wherein several actuating devices are provided and wherein the actuating devices act on non-planar surfaces contained on different profiles of the same spiral rotor.

Referring now to FIG. 4 there is shown another embodiment of the system with a spiral rotor according to the invention.

In this configuration the system (200) provides a plurality of devices (only the sliders or followers 5 being shown in the figure), some of which are not arranged on the same horizontal plane containing the rotor (203). The system (200) comprises a shaft (230) connected to the rotor (203).

The rotor (203) provides curvilinear profiles both on the horizontal (radial) surfaces and on the outer (tangential) surface containing each retraction ramp (205) and (206), respectively.

More precisely, a first ramp (205) is on an outer surface of the rotor (203) The rotor (203) has a curvilinear spiral profile. One or more actuating devices are arranged both on the horizontal and the vertical plane, to operate on the rotor (203) as said above. Each actuating device (50) has a structure as described in FIG. 1.

Some actuating devices (50) are positioned perpendicular to the rotor surface (203). The effective force of the devices positioned perpendicularly creates a rotation of the rotor (203) in the same direction (as indicated by the arrow) of those generated by the groups of devices (50) arranged at different positions contained in the horizontal plane containing the rotor, and therefore these forces are cumulative with the forces applied to the rotor by the other devices (50) mounted in different configurations.

Moreover, in a further alternative embodiment, three different surfaces of the rotor (203) can be engaged at the same time. The actual forces applied by all the devices (50) groups are combined to generate rotor rotation.

Therefore, it is possible to simultaneously engaging on the same rotor, groups of internal combustion cylinders fed with different fuels, and arranged onto the different profiles of the rotor.

In the following embodiments, the force applied to the rotor it is transmitted via slider or follower (5) at a different angle from the rotor surface.

Figure 5:
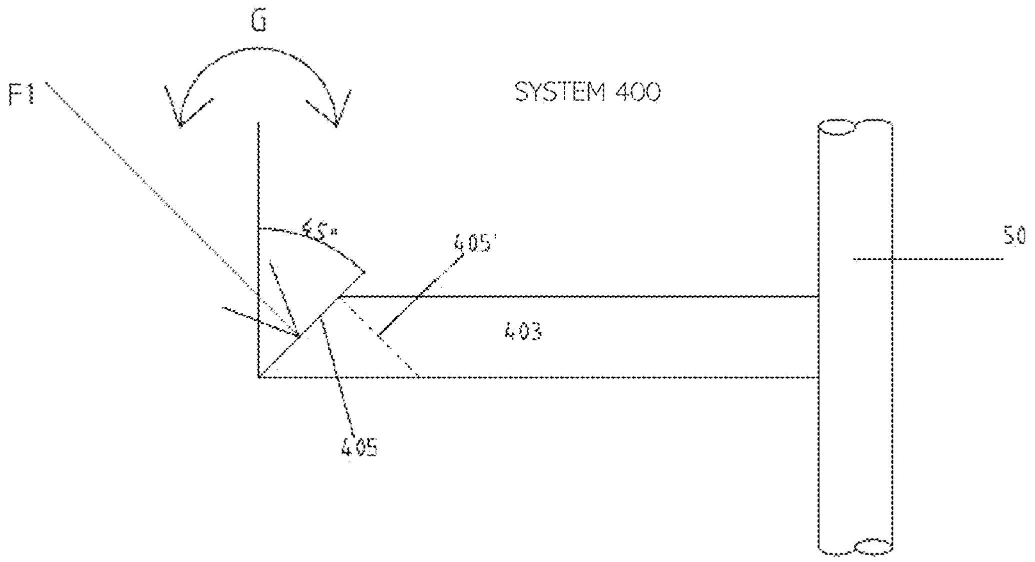
FIGS. 5 to 8 are schematic diagrammatic figures illustrating the force components applied to the rotor of the system of the present invention, and according to different embodiments thereof.

Referring now to FIG. 5, it shows in a partial and sectional view a system 400 which includes a spiral profiled rotor (403) coupled to a shaft (50) (partially shown in the figure). The outer surface of the rotor (403) has an outer interacting surface (405) which is inclined by a predetermined angle (which, according to the invention, can be comprised from about 1 to 89 degrees) with respect to the plane wherein the rotor (403) it is contained.

In the system 400 a combination of actuating devices (not shown) act on the rotor (403) at the inclined interacting surface (405). In this embodiment of the system, the assembly of devices (not shown) work with an inclination of 45 degrees relative to the rotor (403) and gives a greater net driving force to the rotor (403). The resulting force it is a force as shown by the F1 arrow.

Changing the inclination angle of the surface (405) of the rotor (403) the net force F1 applied to the rotor (403) will change accordingly as a result of the variation of the angle because the transmitted force it is a vectoral function of direction.

While the inclination angle can vary from 1 to 89 degrees with respect to the surface of the rotor (403), the relative orientation of the whole assembly of the actuating devices can be modified in any position between about 1 and 179 degrees with respect to the surface of the rotor (403) or between −89 and +89 degrees with respect to the normal direction of the surface (405) as indicated by the double arrow G.

Figure 10:
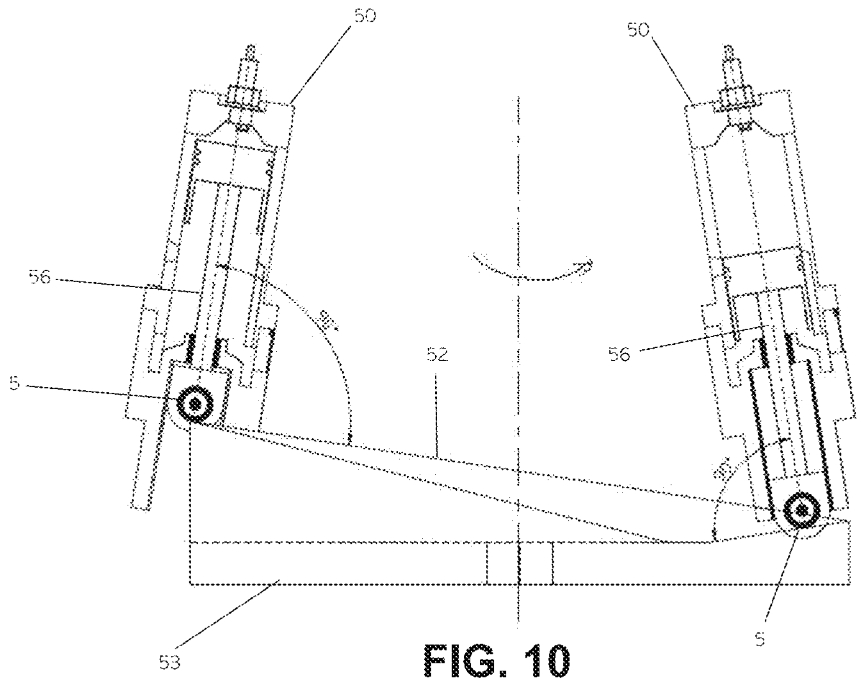
FIG. 10 illustrates a schematic view of a further embodiment of the system of the present invention.

According to this system 400, the actuating devices can interact in a direction on the inclined surface (405) or in the opposite mirroring direction on the surface (405') of the rotor (403), as shown in dashed lines in FIG. 10.

Figure 6:
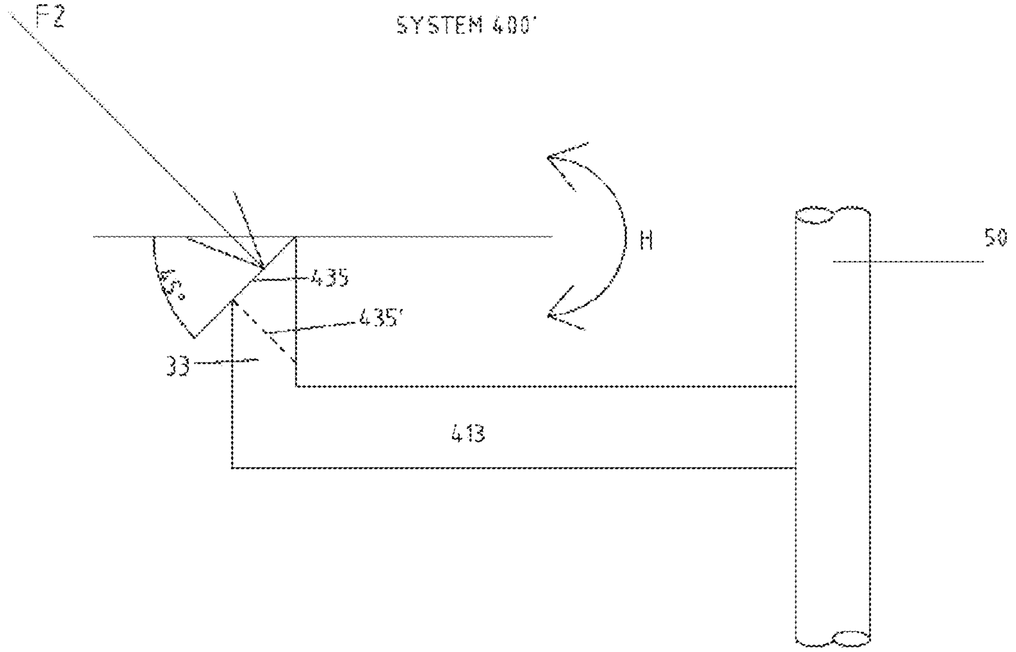

FIG. 6 shows a system 400' which is similar to the preceding system of FIG. 5, wherein a profiled section (33) extends from the plane of a rotor (413) as described above. In this embodiment, a interacting surface (435) of the rotor profile (33) of the rotor (413) it is inclined with respect to the profiled section (33). Also in this case, the inclination angle of the surface (435) can vary from 1 to 89 degrees with respect to the plane of the rotor (413).

In the present embodiment, if the drive unit assembly of devices (not shown) is positioned orthogonal to the profiled section (33), in this case the resulting force is applied with an angle indicated by the arrow F2. In this case, the angle of the inclined surface (435) can alternatively vary from about 1 to 89 degrees with respect to the plane of section (33) and as shown by the dashed line (435'). Furthermore, the orientation of the actuating devices assembly 50 (not shown) can be comprised within any angle between 0 and 180 degrees as the double arrow H shows, in order to provide a variety of different driving forces at different angles, i.e. at any angle corresponding to from about 0 to 180 degrees relative to the surface of the rotor (413).

Figure 7:
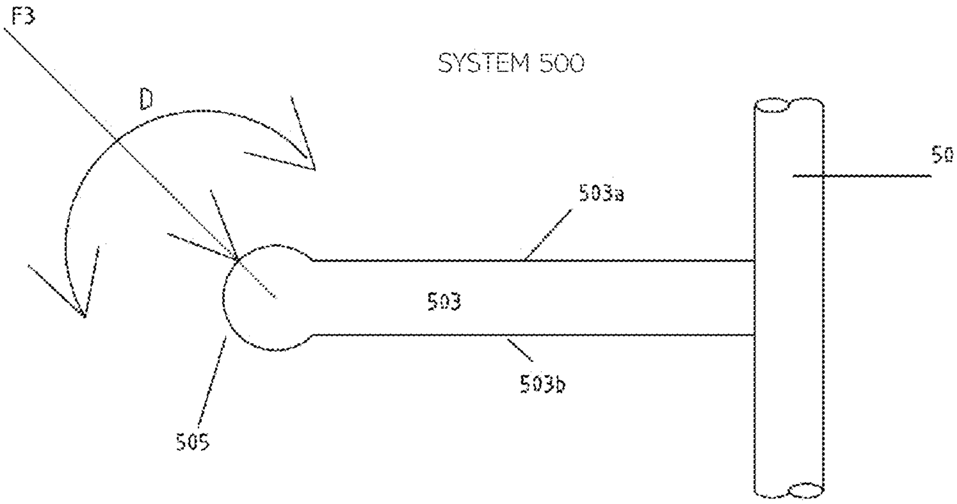

Referring now to FIG. 7 there is shown in a partial and cross sectional view another embodiment of the rotor according to the invention. According to this embodiment, there is provided a system 500 which comprises a spiral profiled rotor (503) comprising a circular profiled interacting surface, i.e. a convex surface (505). In this way, it is possible to provide a continuous and uninterrupted surface which allows a plurality of different angles of interaction with the respective actuating devices (not shown in the figure) and wherein the force can be applied as a function of the position of each actuating device.

The outer peripheral surface of the rotor (503) it is a rounded surface (505), and extends substantially 360 degrees from a first point of the surface (503*a*) of the rotor (503) to a second point of the surface (503*b*) of the rotor (503). The arc length of the rounded surface (505) depends on the thickness of the rotor (503).

The drive assembly of the plurality of actuating devices 50 (not shown) can be arranged in a condition which is normal to the surface and in any position along the convex surface (505), in the direction indicated by the two-headed arrow "D". By way of example, a force can be applied by an actuating device along a line as indicated by the arrow F3.

In this way, a greater net force can be applied by the group of actuating devices (not shown) by adjusting the inclination angle of the group of actuating devices relative to the plane wherein the rotor (503) resides.

Figure 8:
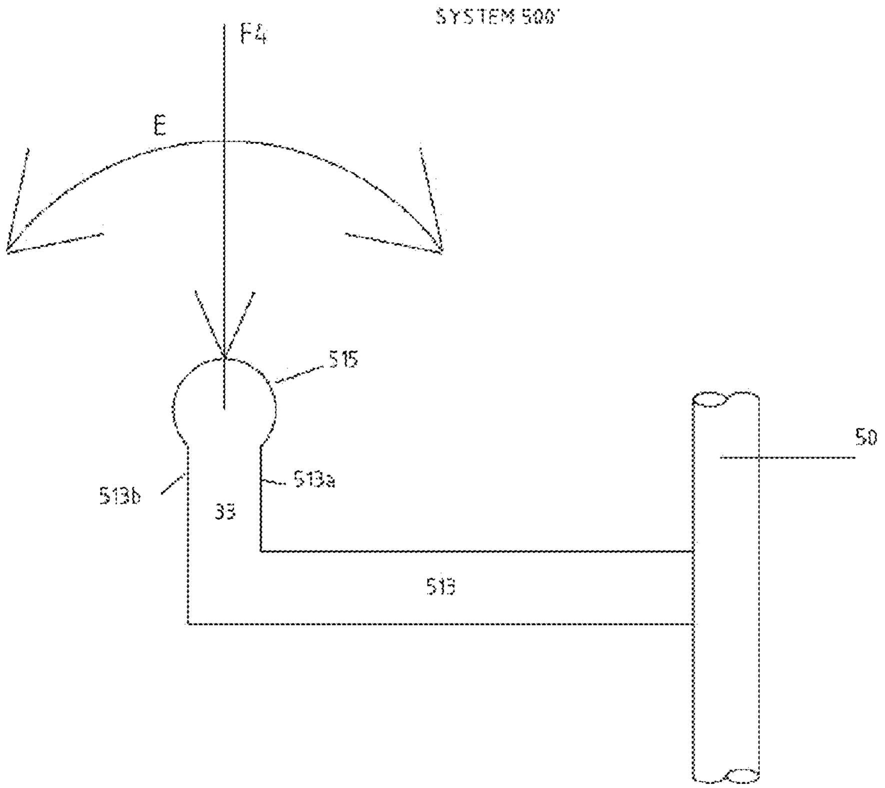

Referring now to FIG. 8 there is illustrated a further embodiment of the invention. According to this embodiment, a system 500' it is provided which comprises a rotor (513) substantially similar to the rotor (503) shown in FIG.

7, but incorporating a different interacting surface contained on a profiled section (33), wherein the section (33) it is vertically oriented (i.e., 90 degrees) with respect to the plane of the rotor (513). The upper interacting surface of the section (33) has a circular shaped outer interacting surface (515). The circular interacting surface (515) extends from 1 to 360 degrees on the section (33).

The assembly of the actuating devices 50 (not shown in the figure) can be oriented in relation to the circular surface of the rotor profile at any position along the surface (515), in the direction of the double arrow E, to have any inclination in relation to the circular surface (515), thus determining the direction of the force of the arrow "F4".

Referring now to FIGS. 9A, 9B, 9C and 9D, the interaction between the rotor surface and a follower and rod of an actuating device at the varying of the inclination of the latter with respect to the normal direction of the rotor interacting surface it is shown, and according to the system of the present invention.

As can be understood from the figures, by changing the inclination of the actuating device (wherein only the rod 706 and a slider or follower 705 of the relevant actuating device is shown) with respect to the rotor interacting surface (703) it is possible to obtain different values of forces and consequently different torque values onto the rotor (703).

Figure 9A:
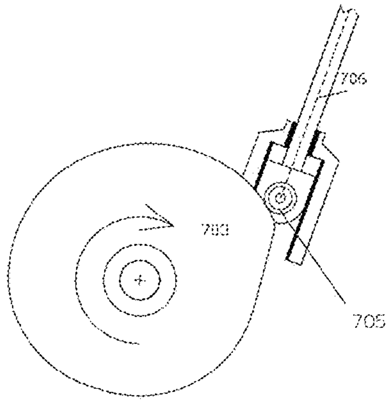
FIGS. 9A, 9B, 9C and 9D are views which schematically illustrate the interaction between the rotor interacting surface and the actuating device as the inclination of the actuating device varies with respect to the normal direction of the rotor interacting surface.
Figure 9B:
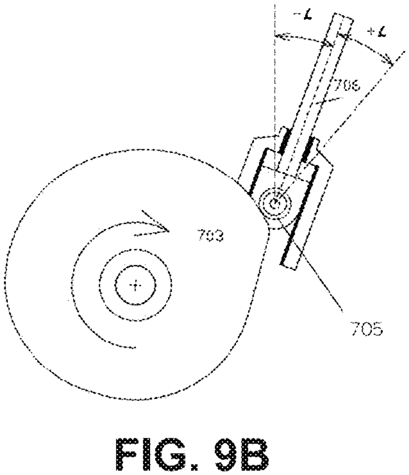
Figure 9C:
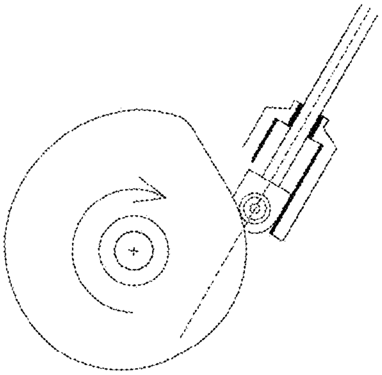
Figure 9D:
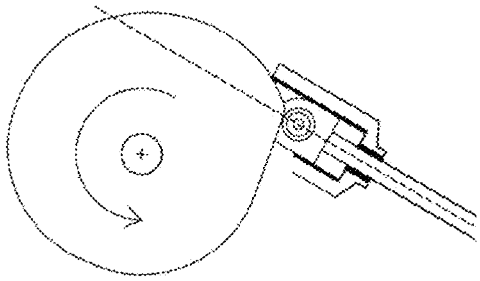

More precisely and with particular reference to FIGS. 9B and 9D, by changing the inclination of the actuating device (i.e., the rod 706) from (−L) to (+L), the lever arm acting on the rotor axis (703) is consequently changed, as well as the stroke of the related actuating device, and also the rotation direction of the rotor (703), as shown in FIG. 9D.

It should be noted here that the cycle phases do not change, so that the expansion and compression phase of the device (706) are always related to the spiral profile of the rotor (703).

According to this configuration it is possible to considerably increase the torque on the rotor axis (703) thanks to the varying of the degrees of inclination of the device (706). Moreover, it is also possible to vary the stroke of the device (706) proportionally to the inclination of the same with respect to the surface of the rotor (703). In this way a longer or shorter stroke can be obtained, according to the constructive needs, but always corresponding to a complete rotation of the rotor (703).

Referring now to FIG. 10, there is shown a further embodiment of the system of the present invention.

According to this embodiment, a new interaction solution there is provided between one or more piston cylinders 50 (i.e., the interacting devices) and one interaction surface (52) of a rotating rotor (53) about its own longitudinal axis of rotation, wherein the rotor (53) has a circular shape, and wherein the interaction surface (52) of the rotor (53) with said one or more piston cylinders (50) it is arranged in a normal direction with respect to the longitudinal axis of the rotor (53) and has a spiral profile with the relevant elevation. The follower (5) engages with the interaction surface (52) of the rotor (53) in a rolling manner, as evident in the figures.

It should be pointed out here that according to further alternative embodiments, the rotor (53) can have one or more interaction surfaces, each of them being normally and/or parallel arranged with respect to the longitudinal axis of rotation of the rotor (53)

According to the present embodiment, the positioning of the cylinders (50) provides that each cylinder (50) it is arranged in a manner that the rods (56) of each cylinder (50) be always at 90 degrees with respect to the interaction surface (52) of the rotor (53), i.e. orthogonal to the interaction surface (52).

This configuration guarantees an ideal distribution of forces on the surface of the rotor (53), where the same give maximum effect.

This configuration is applicable both for internal combustion cylinders, or pneumatic or hydraulic cylinders or other equivalent solutions.

According to this embodiment, the force created by the assembly of the piston-cylinders (50) is always applied with a right angle throughout the active phase of the cycle, thus transmitting a better energetic effect with minimum energy losses involved.

Figure 11:
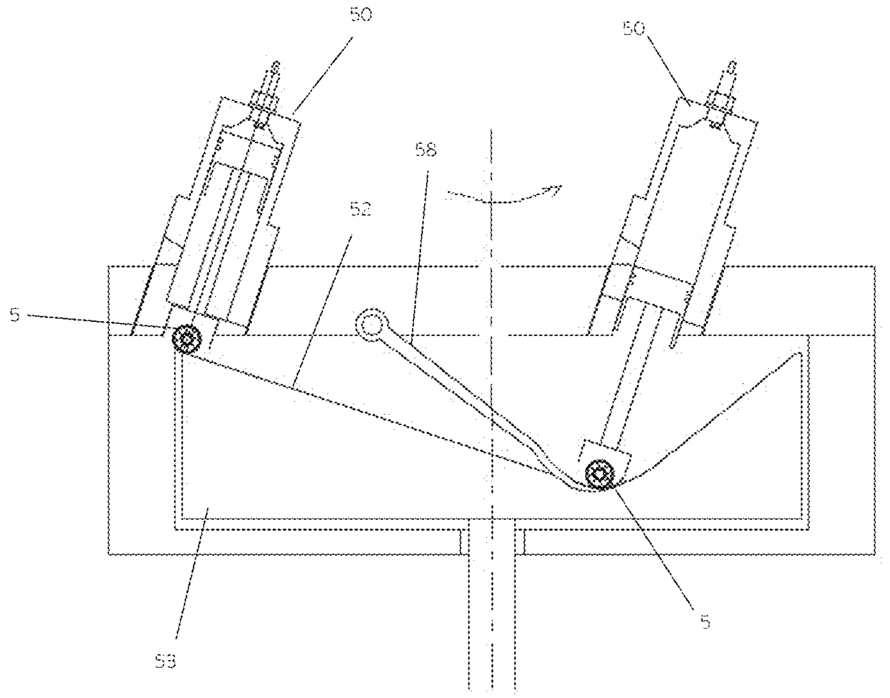
FIG. 11 shows a schematic view of another embodiment of the system of the present invention.

With reference now to FIG. 11 there is illustrated another embodiment of the system of the present invention.

According to this embodiment, an interaction surface (52) of one or more cylinder-pistons (50) of a rotor (53) about a longitudinal axis it is provided, the rotor (53) having a circular shape, and the interaction surface (52) of the rotor (53) is always orthogonal to the slider or follower (5) of each of said one or more piston cylinders (50), and the interaction surface (52) has a spiral profile with a relevant lift ramp.

It should be noted here that according to alternative embodiments the rotor (53) can have one or more interaction surfaces (52).

Further, a lever mechanism (58) it is provided which acts during the piston stroke phase at the top dead center T.D.C. in the compression phase. That is, given that the portion of the rotor comprising the spiral profile (52) has a lift ramp with an excessive inclination and therefore creates excessive frictional forces during the stroke of the piston, the arrangement of the lever (58) allows to provide to the follower (5) a lift force which eliminates such problems during operation.

More precisely, the lever it is connected to the engine block and therefore does not rotate with the rotor (53). The lever has a fork shape and a relevant slider or follower is placed at the fork end. The ramp acts on the fork slider, while the end of the lever (58) interacts with the slider (5) of the piston rod (56). While approaching the ramp, the lever (58) rises and returns the piston to the top dead center T.D.C.

As soon as the top dead center of the piston T.D.C. is reached, the lever (58) it is released and returns to the starting position. This solution, albeit simple, has the enormous usefulness of limiting the forces applied which generate resistance to the displacement, and the friction is brought to a minimum.

This configuration is applicable for both internal combustion cylinders, or pneumatic cylinders, or hydraulic cylinders or other equivalents.

It will be apparent to those skilled in the art that the present invention it is susceptible to other modifications in addition to what has been disclosed herein, without departing from the spirit of the present invention and all included in the scope of the appended claims.

What is claimed is:

1. A system for the reversible transformation of a reciprocating motion in a rotary motion, which comprises one or more actuating devices (50) adapted to cooperate with a rotor (53; 63) having a spiral shaped section, and which has at least one interaction surface (52, 62) for interacting with said one or more actuating devices (50), characterized in that each actuating device (50) of said plurality of actuating devices (50) is an internal combustion cylinder and piston device, and wherein each actuating device (50) is associated with a rod (56)

which incorporates a slider (5) which engages with said at least one interaction surface (52) of said rotor (53; 63), wherein the rotor (53) includes a constant diameter profile section (55), the arrangement being such that during operation said constant diameter profile section (55) keeps the piston in a stopped position at the top dead center T.D.C. for a combustion phase, thus ensuring complete combustion at constant volume.

2. The system for the reversible transformation of a reciprocating motion in a rotary motion according to claim 1, wherein said spiral cross section shaped rotor (53, 63) has at least a portion (55, 65) of said at least one interaction surface (52, 62) of the profiled rotor (53; 63) having a constant diameter, the arrangement being such that when said slider (5) engages the constant diameter portion (55, 65) of said rotor (53; 63), the volume inside the cylinder of the actuating device (50) is not changed.

3. The system for the reversible transformation of a reciprocating motion in a rotary motion according to claim 1, which comprises one or more actuating devices (11; 50) adapted to cooperate with a with spiral section rotor (53; 63), wherein each actuating device is arranged in a condition inclined with respect to the normal direction of said at least one interaction surface with the rotor (3; 53; 63).

4. The system for the reversible transformation of a reciprocating motion in a rotary motion according to claim 1, wherein the arrangement of each actuating device (11; 50) is such that when the inclination of the device (50) is changed with respect to the normal direction of said at least an interaction surface (52, 62) of said rotor (53; 63) varies the thrust value of the device (11; 50) created onto said rotor (53; 63), and consequently also varies the torque value to the rotor (53; 63).

5. The system for the reversible transformation of a reciprocating motion in a rotary motion according to claim 1, which comprises one or more actuating devices (11; 50) adapted to cooperate with a spiral section rotor (53; 63), wherein each actuating device is arranged in a inclined manner with respect to the normal direction of said at least one interaction surface (52; 62) with the rotor (53; 63), wherein the arrangement of each actuating device (11; 50) is such that when the inclination of the device varies with respect to the normal direction of said at least one interaction surface (52; 63) of said rotor (53; 63) also varies the expansion/compression phase of each actuating device (11; 50) with respect to a complete revolution of said rotor (53; 63).

6. The system for the reversible transformation of a reciprocating motion in a rotary motion according to claim 1, wherein the arrangement of each actuating device (11; 50) is such that when the inclination of the device (11; 50) varies with respect to the normal direction of said at least one interaction surface (52; 63) of said rotor (53; 63), the rotation direction of said rotor varies.

7. The system for the reversible transformation of a reciprocating motion in a rotary motion according to claim 1, wherein said rotor (403; 413) has at least one interaction surface (405; 435) for said one or more actuating devices (11; 50) which is inclined with respect to the longitudinal direction of the rotational axis of said rotor (403; 413).

8. The system for the reversible transformation of a reciprocating motion in a rotary motion according to claim 1, wherein said rotor (403; 413) has at least one interaction surface (405; 435) for said one or more actuating devices (11; 50) which is inclined with respect to the longitudinal direction of the rotational axis of said rotor (403; 413), wherein said at least one interaction surface (405; 435) is inclined with respect to the longitudinal direction of the rotational axis of the rotor (403; 413) of an angle value comprised between 1 and 89 degrees.

9. The system for the reversible transformation of a reciprocating motion in a rotary motion according to according to claim 1, wherein said rotor (403; 413) has at least one interaction surface (405; 435) for said one or more actuating devices (11; 50) which is inclined with respect to the longitudinal direction of the rotational axis of said rotor (403; 413), wherein said at least one interaction surface (405; 435) is inclined with respect to the longitudinal direction of the rotational axis of the rotor (403; 413) of an angle value comprised between 1 and 89 degrees; and wherein wherein each actuating device (11; 50) is arranged in an inclined condition with respect to the normal direction of said at least one of surface interaction (405; 435) of said rotor (403; 413) of an angle comprised between −89 and +89 degrees.

10. The system for the reversible transformation of a reciprocating motion in a rotary motion according to according to claim 1, which comprises one or more actuating devices (11; 50) adapted to cooperate with a spiral section rotor (53; 63), wherein each actuating device is arranged in an inclined condition with respect to the normal direction of said at least one interaction surface (505, 515) of said rotor (503; 513), wherein said rotor (503; 513) has at least one interaction surface for the said one or more actuating devices (11; 50) which is a convex surface (505; 515).

11. The system for reversible transformation of a reciprocating motion in a rotary motion according to according to claim 1, which comprises one or more actuating devices (11; 50) adapted to cooperate with a spiral section rotor (53; 63), wherein each actuating device is arranged in a condition inclined with respect to the normal direction of said at least one interaction surface with the rotor (53; 63), wherein each actuating device (11; 50) is arranged in a normal condition with respect to said convex surface (505).

12. A system for the reversible transformation of a reciprocating motion in a rotary motion according to claim 1, comprising one or more actuating devices (11; 50) adapted to cooperate with a rotor (53; 63; 403; 413; 503; 513) rotatable about a longitudinal axis, the rotor having at least one spiral profiled interaction surface (52; 62; 405; 435; 505; 515) for interacting with said one or multiple actuating devices (11; 50) having, the interaction surface comprising at least one ramp, wherein each actuating device of said plurality of actuating devices (11; 50) comprises one or more internal combustion piston cylinders which each incorporate a rod (56) and a slider (5), and wherein the arrangement of each cylinder with respect to the interaction surface of the rotor always forms an angle of 90 degrees.

13. A system for the reversible transformation of a reciprocating motion in rotary motion, which comprises one or more actuating devices adapted to cooperate with a rotor in an engine block, the rotor having a spiral profiled cross section comprising at least one ramp and which has at least one interacting surface with said one or more actuating devices, wherein each actuating device of said plurality of actuating devices is an internal combustion piston cylinder which incorporates a rod and a slider or follower, and wherein a lever mechanism is provided by which the piston return stroke is performed at the top dead center T.D.C. in the compression phase, said lever mechanism comprising a lever connected in an oscillating manner with said engine block and the lever being fork shaped, said fork having a slider at the end thereof and adapted to cooperate with said interaction surface of said rotor, and wherein said end of said fork lever being adapted to interact with the slider of the piston rod, and wherein during the approach of the rod to said ramp, said lever rises and returns the piston to the T.D.C., and wherein when the cursor reaches the T.D.C. of the piston, said lever disengages from said rod and returns to its initial position.

14. A system for the reversible transformation of a reciprocating motion in rotary motion, which comprises one or more actuating devices adapted to cooperate with a rotor in an engine block, the rotor having at least one interacting surface with said one or more actuating devices, said rotor (53; 63) having a spiral shaped section, and which has at least one interaction surface for interacting with said one or more actuating devices (50), wherein each actuating device (50) of said plurality of actuating devices (50) is an internal combustion cylinder and piston device, and wherein each actuating device (50) is associated with a rod which incorporates a slider which engages with said at least one interaction surface of said rotor (53; 63), wherein the rotor (53) includes a first constant diameter profile section (55), the arrangement being such that during operation said a constant diameter profile section (55) keeps the piston in a stopped position at the top dead center T.D.C. for the combustion phase, thus ensuring complete combustion at constant volume, and wherein the rotor (53) includes a second constant diameter profile section (65) extending from the exhaust valve opening position to the initial compression phase position, the arrangement being such that the piston is kept in a stopped position at the bottom dead center B.D.C. for the complete waste/washing/filling phase of the cylinder, wherein said rotor includes a compression ramp (64), and an expansion section of the spiral profile (62) of the rotor (63).

* * * * *